Jan. 2, 1968 R. P. ANNEN ETAL 3,361,421
MEANS TO METER MOLTEN METAL
Original Filed Nov. 5, 1964 5 Sheets-Sheet 5

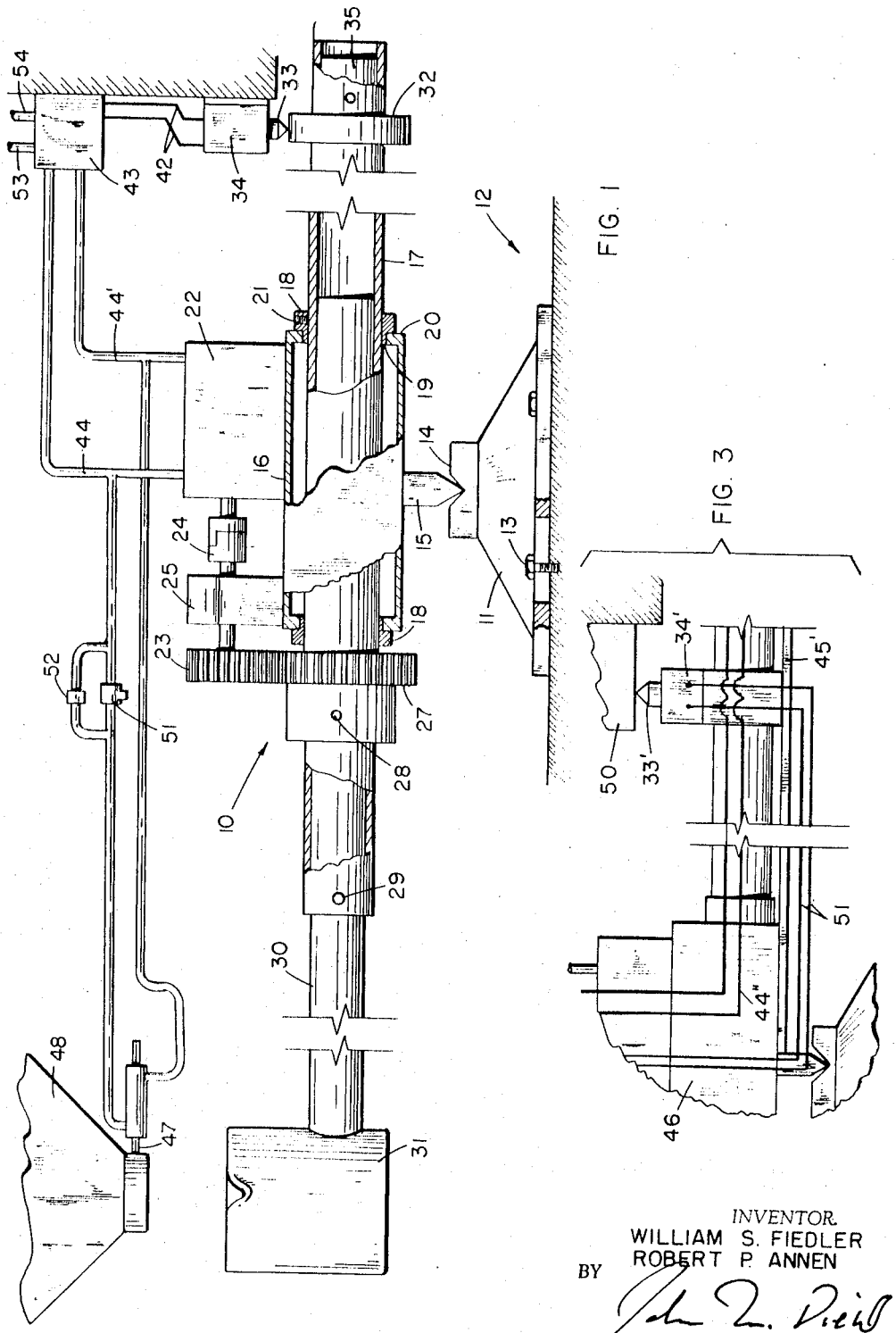

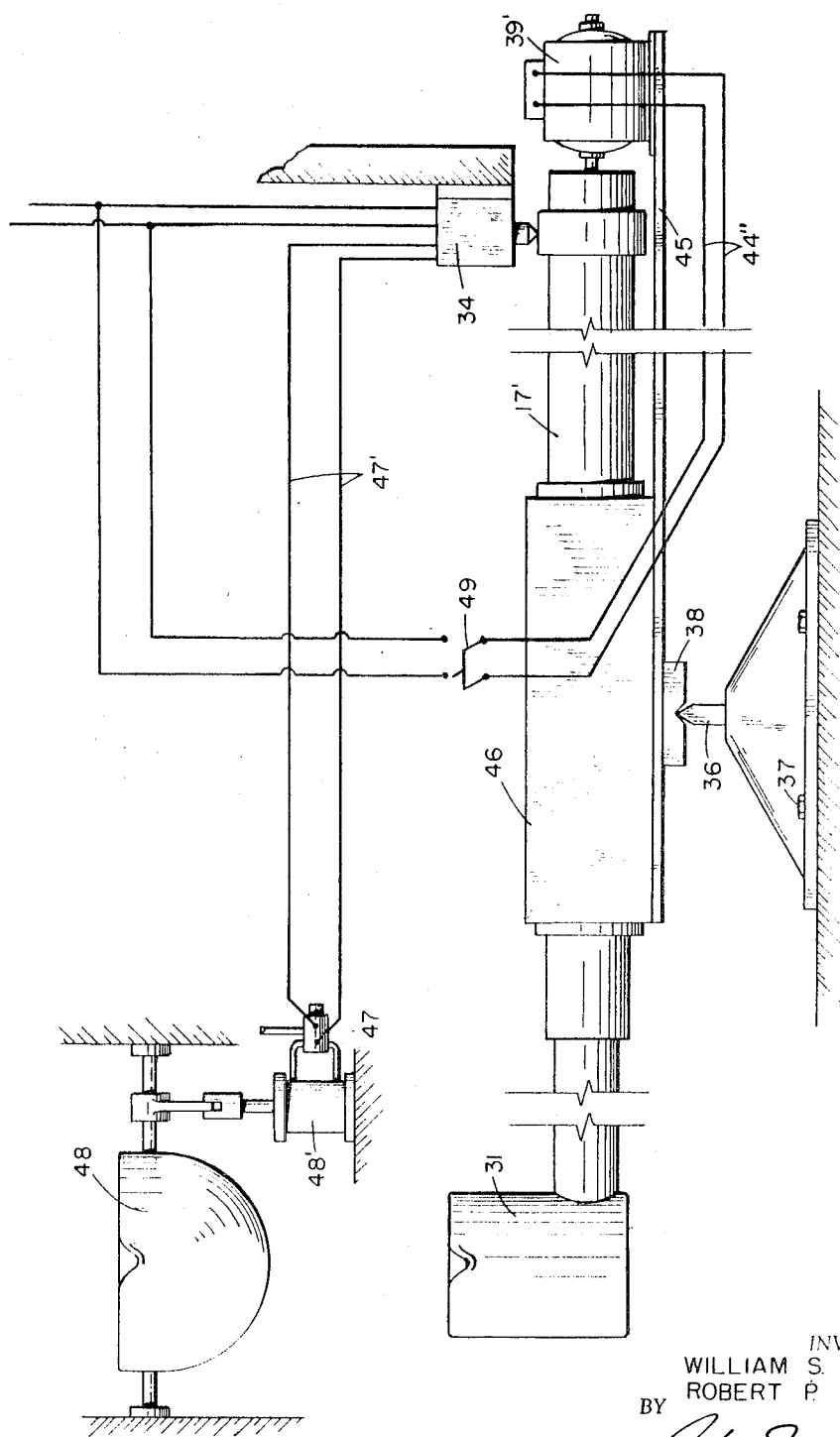

INVENTOR.
WILLIAM S. FIEDLER
ROBERT P. ANNEN
BY

ATTORNEY

United States Patent Office 3,361,421
Patented Jan. 2, 1968

3,361,421
MEANS TO METER MOLTEN METAL
Robert P. Annen, Madison, and William S. Fiedler, Racine, Wis., assignors to Lor Corporation, Enid, Okla., a corporation of Delaware
Original application Nov. 5, 1964, Ser. No. 410,047, now Patent No. 3,256,948, dated June 21, 1966. Divided and this application May 19, 1966, Ser. No. 554,932
1 Claim. (Cl. 266—38)

ABSTRACT OF THE DISCLOSURE

A rotary furnace is provided to contain molten metal and to discharge molten metal in response to rotation. A portion of the weight of the furnace is supported on the piston of a hydraulic cylinder. The pressure of hydraulic fluid in this cylinder is communicated to the interior of a second cylinder. A load cell is provided attached to the piston of the second cylinder to respond to the pressure of the hydraulic fluid exerted against the second piston. Means are provided to receive a signal from the load cell and in accordance with this signal terminate rotation of the furnace while metal is being poured and cause the furnace to return to its original position.

---

This application is a divisional application of application Ser. No. 410,047, filed Nov. 5, 1964, now Patent No. 3,256,948, having the same title.

This invention relates to a machine for metering a charge of molten metal before introduction of the charge into a mold, and more particularly relates to a device comprising a beam balanced on a fulcrum at a point along its mid-section and provided with a pot at one end extremity thereof for receiving a charge of molten metal and with an automatic control means at its opposite end extremity for controlling the weight of metal introduced into the pot. The control means comprises a strain gauge control which actuates electrical relays when the gauge reaches a predetermined amount of distortion, thereby causing the beam to be rotated about its longitudinal axis and the pot to be tipped so that the charge of molten metal in the pot is emptied into a mold. The invention is applicable to foundry practice wherein castings of controlled weight and density are desired such as in the casting of foam metal objects.

It is an object of this invention to provide automatic means for weighing and casting a charge of molten metal.

It is another object of this invention to provide a sensitive and accurate means for metering large charges of molten metal.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 1 is an elevation in partial cutaway of the device of this invention;

FIGURE 2 is an elevation of another embodiment of this invention wherein motor means are disposed adjacent an end extremity of the beam device so as to counterbalance the weight of the metal charge at the outer end thereof;

FIGURE 3 is an elevation of another embodiment of this invention wherein the control element is integrally disposed with the beam member;

Figure 4:
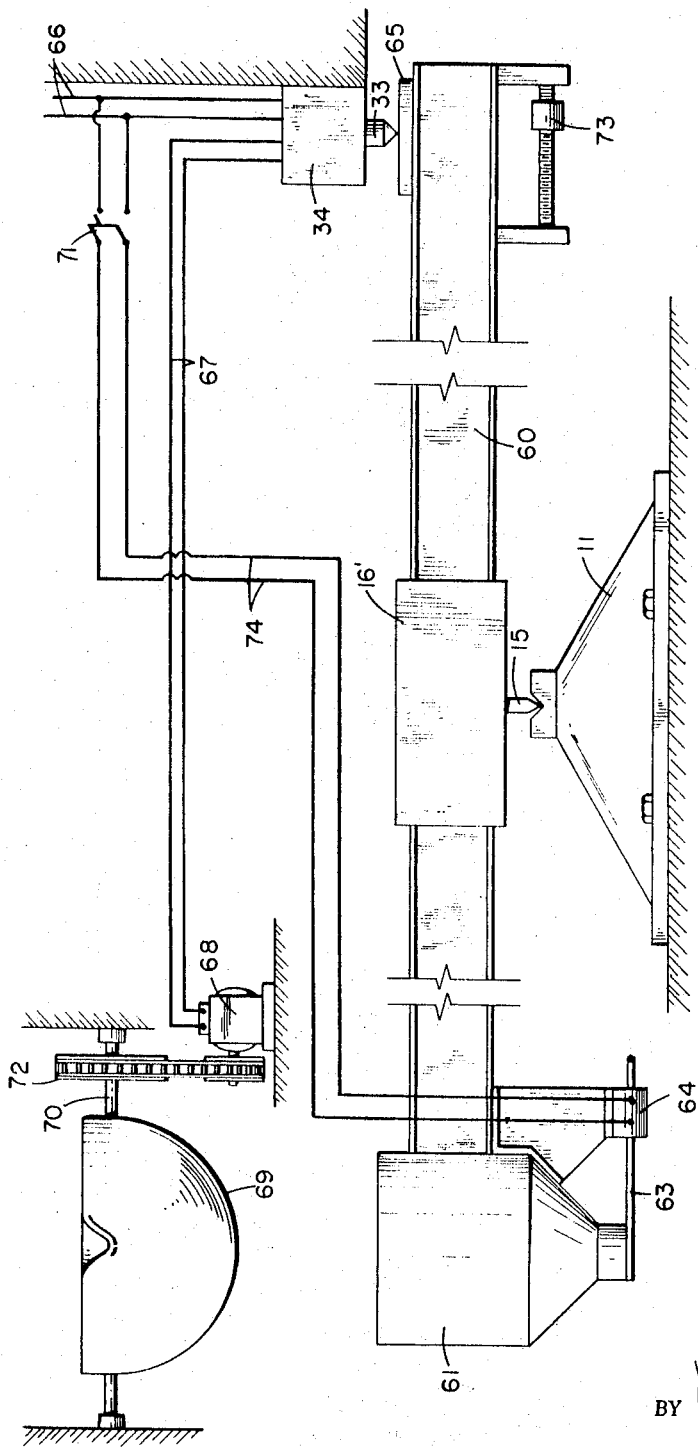
FIGURE 4 is an elevation of a non-rotating beam balance.

Referring now to FIGURE 1, rotating beam balance 10 is shown comprising base mounting 11 secured to floor 12 by bolts 13. Base mounting 11 can be adjusted to the left and right as shown in FIGURE 1 by loosening bolts 13 and displacing the base to the left or to the right a desired distance and again tightening bolts 13: V configured slot 14 in base mounting 11 is preferably several inches long and is adapted to receive knife edge 15 affixed to tubular saddle member 16. Saddle member 16 is provided with internal bushings which operably support beam 17 on a coincident axis therewithin. Beam 17 is restrained against axial movement by means of collars 18 on bushings 19 at either end of saddle member 16. Bushings 19 may comprise friction bearing material such as brass or lead antimony alloy or may comprise material for use with antifriction bearings. The bushings are fitted between beam 17 and surface 20 of saddle member 16. Set screws 21 are provided in bushings 19 to fixedly secure the bushings to shaft 17, thereby operably preventing axial movement of shaft 17 relative to saddle member 16.

Hydraulic motor 22 is fixedly mounted on saddle member 16 and the drive shaft thereof is coupled to spur gear 23 by means of coupling 24. Motor 22 may be of other character such as electric motor, pneumatic motor or other suitable means. Coupling 24 may be of any operable construction. Bearing 25 provides an operable support for shaft 26, upon which gear 23 is fixedly mounted in meshing relation with gear 27. Gear 27 is secured to beam 17 by means of set screw 28. Motor 22 is designed or geared to provide low-speed, high-torque output such that beam 17 can be rotated through approximately 135° of arc in a few moments' time. Motor 22 is reversible so that beam 17 can be counter-rotated to complete the pouring cycle and ready the apparatus for receiving a new charge.

Beam 17 is preferably of tubular construction and may be provided with inner telescoping beam 30, which can be retained in beam 17 by means of set screw 29 or other operable means in the end extremity of beam 17. Pot 31 is affixed to inner beam 30 and is disposed beneath melting furnace 48. Molten metal can be charged from furnace 48 into pot 31 which can then be rotated by means of motor 22 to pour into another vessel or into a mold. At the opposite end extremity of beam 17 collar 32 having an outer surface machined to a close tolerance is provided in fixed relation to the beam and is disposed in contacting adjacency to sensing member 33 of load cell 34. As shown, an adjustable, counter-balance weight 35 may be provided in the end extremity of beam 17 to compensate for unbalance in device 10. Load cell 34 is wired to control valve 43 to cause either motor 22 or valve 47, or both, to be actuated when sensing member 33 undergoes a predetermined amount of strain. Control valve 43 comprises a two-way or three-way fluid control means if a fluid actuated motor and fluid controls are used or comprises electrical switch means if electrical control means are employed. Valve 47 on furnace 48 is closed when valve 43 is actuated and motor 22 rotates beams 17 and 30 to empty pot 31. When pot 31 is empty motor 22 is reversed, thereby counter-rotating beam 17 and beam 30 and returning pot 31 to upright position to ready the device for recharging pot 31 with molten metal.

The apparatus shown is fully automated, however it may be desirable to provide an overriding manual control for furnace valve 47. Such means are not shown herein however for the sake of convenience. Pressurized fluid line 53 and return line 54 are provided for valve 43, and fluid lines 44 and 44' are provided for motor 22 and valve 51. Spring loaded valve 51 in control line 44 is provided to delay actuation of double acting cylinder and piston 48 while pot 31 is being rotated into upright position. Valve 51 restricts fluid circulation to motor 22 until a stop member (not shown) is contacted by beam 17 when pot 31 is in upright position. Fluid pressure then increases in line 44 until valve 51 is operably opened piston and cylinder 47 is actuated. Load cell 34 may be conventional; one type of load cell which may be used is type U–1B, manufactured by Baldwin-Lima-Hamilton Corporation.

The components of rotating beam balance 10, with the exception of load cell 34 which is rigidly attached to structure 36, are supported on knife edge 15. It will be understood that knife edge 15 may be replaced by a hinge means or by other operable means which enable the device to be load responsive and subject to minimum frictional forces. The adaptation of any conventional motor to the use disclosed herein will be understood to be within the abilities of one skilled in the art, and any operable mechanism for actuating a valve such as valve 47 on melting furnace 48 may be used. Means for transmitting torque from motor 22 to beam 17 other than that shown may be used, such as for example, a worm gear, flexible shaft or other operable means. The provision of beam 30 as a telescoping extension of beam 17 and the provision of counterbalance 35 are refinements which need not be present in embodiments of the invention, but which are desirable to provide the greatest flexibility of operation in the apparatus.

In FIGURE 2 is shown another embodiment of the invention similar to that shown in FIGURE 1 wherein knife edge and base member 36 is bolted to the floor by bolts 37. Grooved member 38 affixed to the bottom of collar 46 is configured to receive knife edge 36 and be supported thereby. Motor 39' adjacent the end of beam 17' is coupled to the beam and is controlled by operation of load cell 34 in a manner similar to that described above in relation to motor 22 of FIGURE 1. Support member 45 is rigidly affixed to collar 46 and motor 39' and provides operable support for the latter member. The provision of motor 39' adjacent the end of beam 17' provides a counter-balance for pot 31 and the charge therein and enables the apparatus to be shortened and made more compact than the device shown in FIGURE 1.

Electric leads 44' are preferably connected to collar 46 to minimize variability of weight factors which affect the sensitivity of balance in the beam device. Molten metal can be poured into pot 31 from melting furnace 48 by actuating hydraulic cylinder 48' thereby tilting furnace 48. Operation of furnace 48 is controlled by load cell 34 and valve 47. Cylinder 48' preferably comprises a double acting piston mechanism which causes furnace 48 to be tilted and righted in response to the output of load cell 34. Electric leads 47' operably connect load cell 34 and hydraulic valve 47 while leads 44'' connect manual switch 49 to motor 39'.

In FIGURE 3 is shown another embodiment of a beam balance similar to device of FIGURE 2, but wherein load cell 34' is non-rotative and is supported immovably relative to saddle 46 by support member 45'. Sensing element 33' abuts against stationary member 50. Electric leads 51 to load cell 34' and 44'' to motor means not shown are supported in near adjacency to the fulcrum of the device to minimize frictional drag factors which decrease the weighing sensitivity of the device.

In FIGURE 4 is shown another embodiment of the invention wherein fulcrum 11 provides support for saddle member 16' and knife edge 15 attached to member 16'. Beam 60 is adjustable in saddle member 16' and is non-rotative therein. Receptacle 61 is fixedly attached to the left end extremity of beam 60 as shown in FIGURE 4 and is provided with bottom opening valve 63. Counterbalance 73 is provided adjacent one end extremity of beam 60 to provide fine balance adjustment in the beam while coarse adjustment is made by repositioning beam 60 in collar 16' in operable manner. Valve 63 is actuated by solenoid 64 as shown or by other operable means as desired and is manually controlled by means of switch 71 and electric leads 74. Load cell 34 is affixed to structure member 36 independent of beam 60. Plate 65 on beam 60 provides a level, low-friction contact surface for sensing element 33 of load cell 34. Electrical power leads 66 provide input power to load cell 34 and electrical leads 67 provide connecting means between the output terminals of load cell 34 and controlled motor 68 on ladle 69. Ladle 69 contains flowable material which is poured into receptacle 61 when trunnion 70 is rotated by means of motor 68 and chain drive 72. It is desirable to provide alternate means for operating valve 63 and motor 68.

In all embodiments of this invention, it is desirable to provide a load cell which automatically adjusts to zero loading upon the completion of each cycle so that a uniform weight of metal is introduced into pot 31 each time regardless if the pot was totally emptied during the preceding cycle or whether material remained in the pot as occurs when molten metal is being metered at temperatures near the freezing point of the metal. Any operable zeroizing or re-set mechanism may be provided for this purpose.

The particular advantage of total weighing of a charge of metal which is introduced into a mold in comparison to differential weighing of a furnace from which metal is drawn before and after withdrawal of the metal charge is that greater precision in weighing is effected because the sensitivity of a load cell of the type hereinbefore mentioned wherein a strain gauge comprises the sensing element is a fixed proportional function of the total load to which the cell is responsive; thus, it is advantageous that the total load to which the cell is responsive be only the charge drawn from the furnace rather than the total load contained in the furnace. The maximum absolute sensitivity of the cell is thereby obtained, whereas the absolute sensitivity of the cell is reduced in proportion thereto by a factor equal the proportion of the weight of the material contained in the furnace to the weight of the charge.

Thus, if a load cell of 50,000 pounds capacity is placed directly under a furnace weighing 30,000 pounds and containing a charge of 2,000 pounds of metal, the load cell comprising the only support for the furnace, a sensitivity of ±1% in the load cell will introduce an error of approximately 25% in the weight of the metal in the furnace. If, however, only the weight of the charge in the furnace is supported by the load cell, a 1% sensitivity with a 3,000 pound capacity load cell will provide accurate weighing to ±30 pounds.

Figure 5:
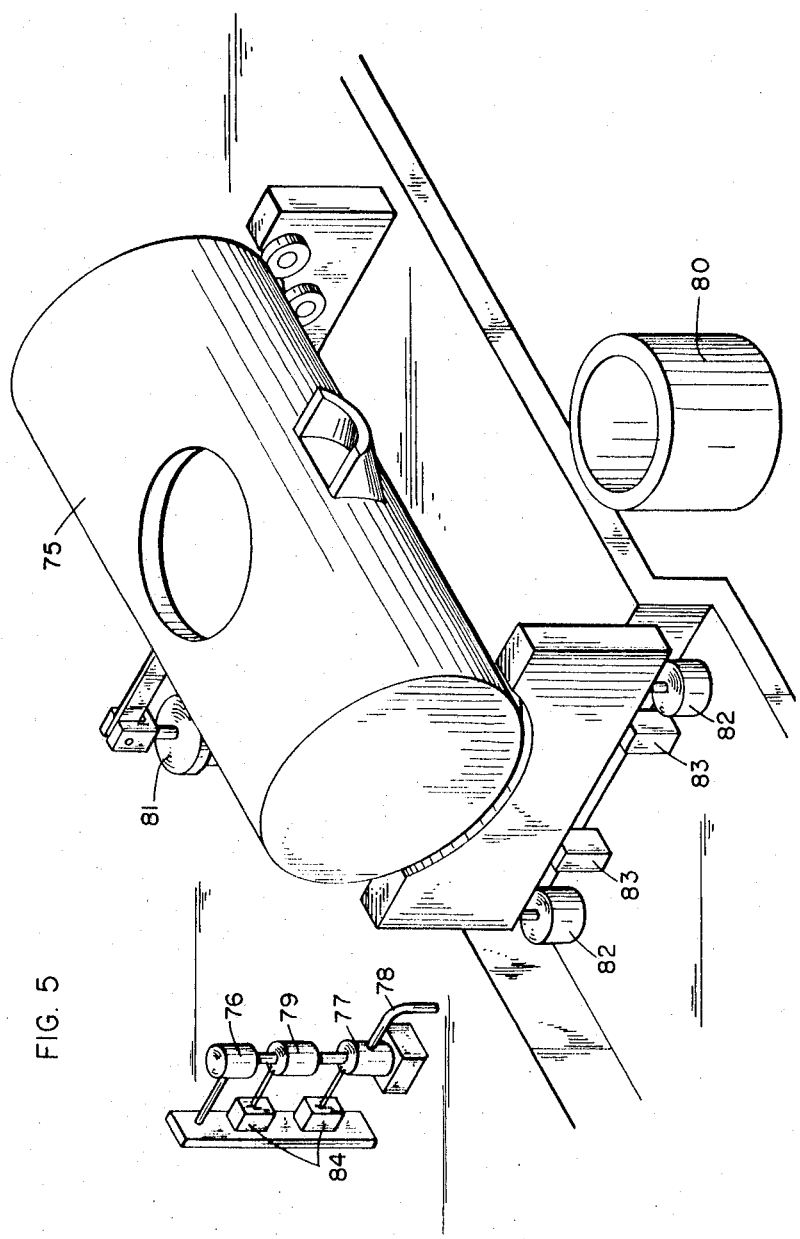
FIGURE 5 is a schematic perspective view of another embodiment of this invention.

In the following embodiment wherein means for differential weighing of a charge of metal in a furnace is disclosed, the sensitivity obtainable in hereinbefore described embodiments wherein total weighing of a metal charge is disclosed is not a preferred embodiment of this invention but is nonetheless far superior to differential weighing of the entire furnace. In FIGURE 5 is shown furnace 75 supported by hydraulic pistons 82 in operable manner. Pistons 82 comprise means for supporting the empty weight of furnace 75. Small counter balancing piston 77 is communicated with pistons 82 by hydraulic fluid line 78. Constant weight 79 acts on piston 77 and is of such mass so as to just counteract the weight of empty furnace 75. When a charge of molten metal is charged into furnace 75, the force with which the hydraulic pistons 82 are biased downward and the force with which weight 79 is correspondingly raised into contact with load cell 76 is a function of the weight of the charge introduced into the furnace. Stop members 83 are provided under the furnace to protect load cell 76 from accidental overloading. Furnace tilting mechanism 81 is actuated by a second and separate hydraulic means (not shown) which is controlled by load cell 76 and can be manually activated and cycled in the manner before described in relation to FIGURES 1-4. However, load cell 76 is provided with automatic reset mechanism to provide for a constant weight discharge from furnace 75 less than the total weight of metal in the furnace during each cycle. It will be understood that the hydraulic system in which pistons 82 and piston 77 are contained is passive and floating. A sealed fluid unit with automatic recharging pump means may be provided if so desired by providing limit switches 84 which control automatic filling or draining of the floating hydraulic system in biasing movement of weight 79 exceeds a predetermined interval is preferred to provide only one set of pistons 82 under furnace 75 and to provide fixed pivotal support for the opposite end of said furnace, the hydraulic support provided by the pistons then being subjected to a fixed proportion of the total furnace weight, one-half the weight as shown. Since vertical movement of the furnace is restricted to a few mils small fraction of an inch preferably, only negligible shift of center of gravity in the furnace occurs therefrom. If desired, however, furnace 75 may be supported at both ends by hydraulic pistons 82. Furnace 75 pours into crucible 80 in a manner similar to that hereinbefore described, with the weight of each pour being determined by the load cell undergoing a predetermined recovery of mechanical strain in operable manner.

Figure 6:
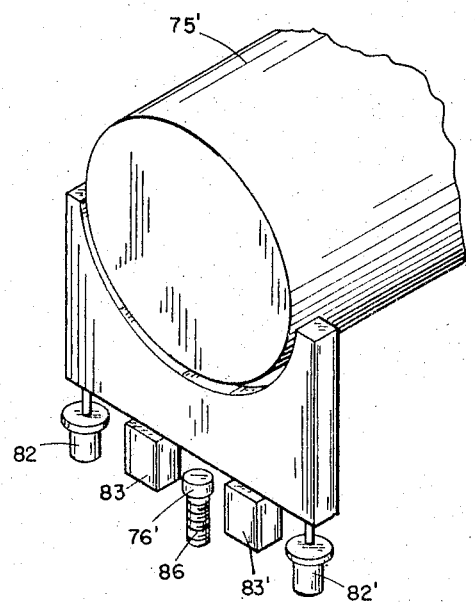
FIGURE 6 is a schematic perspective view of another embodiment of this invention.

In another embodiment of the invention shown in FIGURE 6 load cell 76' is supported on biasable screw jack 86 or on similar means. Emptying furnace 75' is supported on fixed standards 83' while jack 86 is raised until the lead on the load cell 76' is at least equal to the weight of metal which is to be contained in the furnace. Hydraulic pistons 82' are then raised by additional weight being added to the counterbalance (not shown) until load cell 76' is zeroed. Metal is then added to the furnace and is differentially weighed when dispensed, the accuracy and precision of the weighing being of high order, however, because the load cell capacity is of the order of magnitude of the weight of metal contained in the furnaces.

While certain modifications and embodiments of the invention have been described, it is of course to be understood that there are a great number of variations which will suggest themselves to anyone familiar with the subject matter thereof, and it is to be distinctly understood that this invention should not be limited except by such limitations as are clearly imposed in the appended claims.

We claim:

1. Means to meter molten metal comprising receptacle means to contain molten metal, means to support said receptacle means, means to provide for rotation of said receptacle means with respect to said support means, at least one of said support means supported in part by a first piston received in a first hydraulic cylinder, a second hydraulic cylinder containing a second piston, means to communicate fluid from said first cylinder to said second cylinder so that increase in weight on said support which causes the first piston to exert increased pressure on fluid in said first cylinder is transmitted through said fluid to said second piston in said second cylinder, means to introduce a force on said second piston to balance the force exerted thereagainst it by said hydraulic fluid to thereby prevent its movement, said means comprising a load cell to measure force introduced against said second piston by said fluid, means to initiate rotation of said receptacle, means to terminate rotation of said receptacle and means to cause reverse rotation of said receptacle to return it to an original position, means to obtain a signal from said load cell in response to an indication by said load cell of a predetermined weight and means to act in accordance with said signal to actuate said means to terminate rotation of said furnace and actuate said means to initiate reverse rotation of said furnace.

References Cited

UNITED STATES PATENTS

| | | | |
|---|---|---|---|
| 2,922,205 | 1/1960 | Deakins et al. | 22—79 X |
| 2,984,387 | 5/1961 | White | 222—58 |
| 3,263,762 | 8/1966 | Langager et al. | 177—254 X |
| 3,273,470 | 9/1966 | Bradley | 177—254 X |

WILLIAM J. STEPHENSON, *Primary Examiner.*

E. MAR, *Assistant Examiner.*